US005358770A

United States Patent [19]

Evans

[11] Patent Number: 5,358,770

[45] Date of Patent: Oct. 25, 1994

[54] DEVICE FOR RELEASABLY IDENTIFYING OBJECTS

[76] Inventor: Jordan I. Evans, 1429 Thickett Rd., Castleton, N.Y. 12033

[21] Appl. No.: 136,895

[22] Filed: Oct. 18, 1993

[51] Int. Cl.[5] .......................... B32B 3/06; B32B 3/08

[52] U.S. Cl. .................................... 428/99; 428/900; 40/310; 40/600; 40/621

[58] Field of Search .................... 428/99, 900; 40/310, 40/600, 621

*Primary Examiner*—Alexander S. Thomas

*Attorney, Agent, or Firm*—Joseph V. Claeys

[57] ABSTRACT

The invention provides a device arranged to be releasably clamped an object, such as a beverage container, and which thereafter provides fop the personal identification of such container. The device includes an arcuate member, which may be made from a flexible, resilient plastic material. The arcuate member has a semi-circular portion and leg portions extending from each end of the semi-circular portion, and also has an enlarged central region for receiving advertising copy as well as for receiving personal identification indicia. The semi-circular portion and the extending leg portions define an opening fop accommodating an object, such as a bottle or can, and are arranged such that when positioned on the outside of the object the device is tightly but releasably clamped to the outside of such object. The device also has magnets at terminating ends of each of the leg portions which define enlarged planar magnet face surfaces to provide for convenient storage of the device on a ferromagnetic member, such as the wall of a refrigerator when the device is not in use.

8 Claims, 2 Drawing Sheets

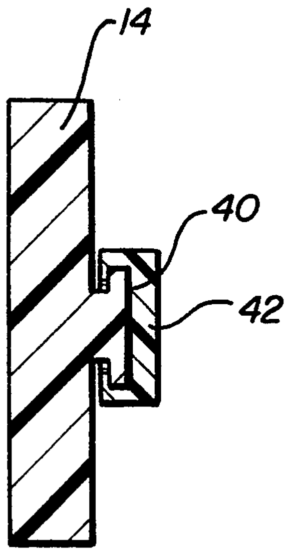
FIG-4
FIG-5
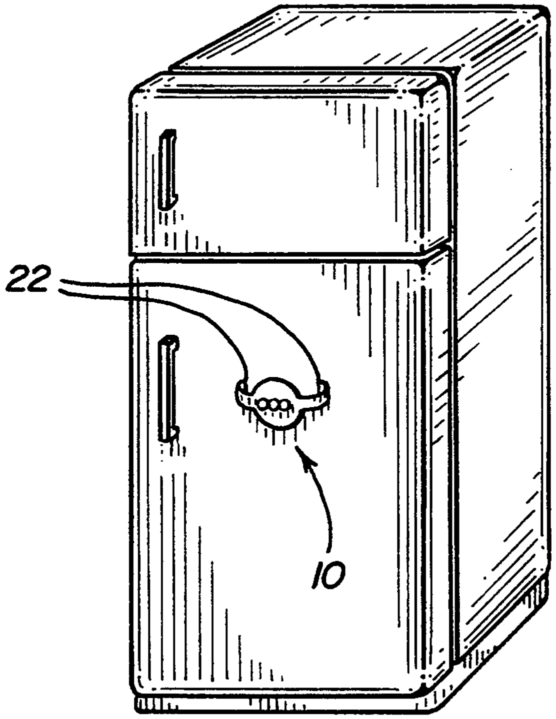

DEVICE FOR RELEASABLY IDENTIFYING OBJECTS

BACKGROUND

This invention relates generally to releasably mounted object indicating devices, and more particularly to a device for releasably affixing personal identifying indicia to an object. The invention is especially advantageous for use in personally identifying an individual's full or partially consumed beverage container, such as a can of soda or the like, which container is kept in a refrigerator or cooler in common with many other like containers of others, although it is not limited thereto.

Numerous types of products are produced in containers which are capable of being opened and the contents thereof only partially consumed. The container can be resealed and the remaining contents consumed at a later time. An example of such a container is a soda bottle or can. The soda bottle or can is often placed in a refrigerator or cooler in common with many other like containers of others to be removed when an individual desires to consume the remaining contents.

In many situations, such as the need to avoid the spread of germs, for example, it is desirable that the individual who consumes the original partial contents of the container be the same individual who consumes the remaining contents. A need exists for a simple, inexpensive and reusable device for conveniently providing for the personal identification of objects, such as beverage containers and the like and which device can be easily stored when not in use.

SUMMARY

It is an object of this invention to provide an identifying device for an object which can be releasably affixed to the object and which carries indicia to identify the user of the object when in use and which device can be conveniently stored when not in use and which is simple and inexpensive.

It is another object of this invention to provide a very simple and inexpensive device which can be releasably affixed to an object, such as a beverage container or the like, having means for affixing identifying indicia thereto to provide for individual personal identification of the object to which it is releasably affixed when in use, and which includes means to provide for convenient storage when the device is not in use.

Briefly stated, in accordance with one aspect of this invention the device comprises a flexible arcuate member arranged and constructed to be releasably clamped about the external surface of the object. Preferably, the arcuate member is moulded from a suitable flexible, resilient plastic material and is therefore relatively inexpensive and easy to manufacture. The arcuate member includes a semicircular portion having leg portions extending from each end thereof. Each of the leg portions terminates in enlarged outwardly directed planar magnet face surfaces. The inner circumference of the semicircular portion approximates but is slightly smaller than the outer circumference of the object, such as that of the beverage container and the semicircular portion and the leg portions extending from the ends of such semi-circular portion are arranged so that they will expand to fit about and releasably clamp the arcuate member to the object. The semicircular portion of the device further includes an enlarged outer central surface region providing space for affixing desired identifying indicia. The indicia may also include advertising copy, such as the name and logo of an organization, in addition to the name or other personal identifying criteria of the user.

Conveniently, the personal identifying indicia may be arranged to be releasably affixed to the enlarged region of the semicircular portion. To this end, the outer surface of the semicircular portion may be provided with a suitable groove, track, or other suitable mounting means on which individual indicia, such as letters or numbers spelling out the name or other identifying criteria of the user may be releasably disposed. Alternatively, the enlarged region may be provided with a suitable area so that the personal identifying indicia may be affixed to such area of the enlarged portion of the arcuate member by a suitable marking device, or the identifying indicia may be affixed in any other convenient and suitable manner.

In accordance with this invention, in order to provide for convenient storage of the device when it is not in use to identify the object, the device also includes magnets disposed at the terminating outwardly directed planar face surface of each of the leg portions so that when the device is not in use it may be conveniently stored by simply being placed on a suitable panel of ferromagnetic material, which may be a storage panel or tray. Conveniently, the storage panel may be the door or an external side wall of a conventional refrigerator or cooler appliance.

BRIEF DESCRIPTION OF THE DRAWINGS

The novel features which I believe characteristic of the invention are set forth with particularity in the appended claims. The invention itself, however, together with further objects and advantages thereof, may best be understood by reference to the following detailed description together with reference to the accompanying drawings wherein:

FIG. 4 is a cross-sectional view of another embodiment of the invention taken along a line similar to that of 3—3 in FIG. 2; and FIG. 5 is a perspective view showing a device in accordance with this invention releasably affixed to the door of a conventional refrigerator by the magnets in the outwardly directed planar faces of the leg portions of the flexible arcuate member for convenient storage of the device when it is not in use.

DETAILED DESCRIPTION

Figure 1:
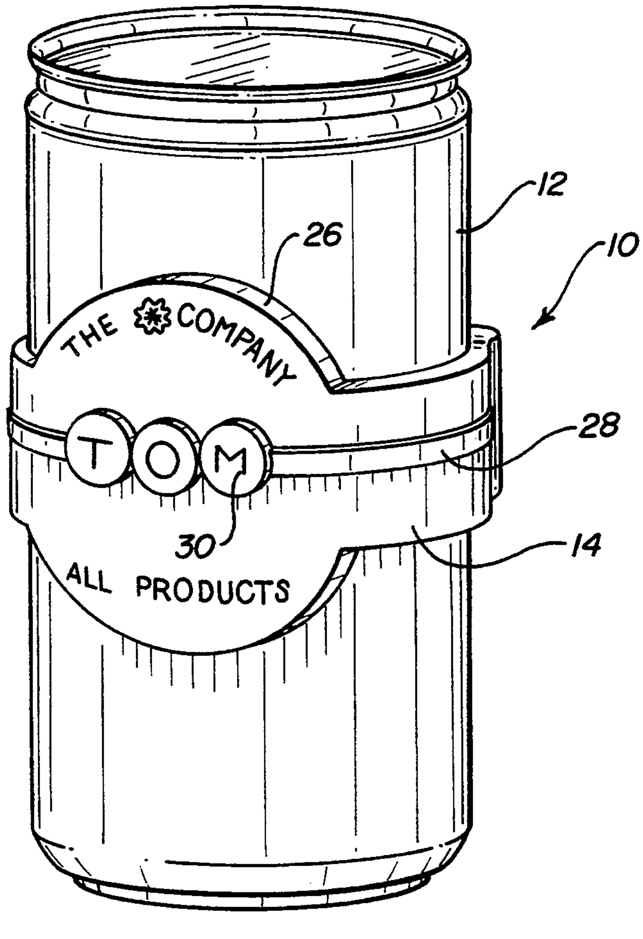
FIG. 1 is a perspective view of one embodiment of the invention shown releasably affixed to a container.
Figure 2:
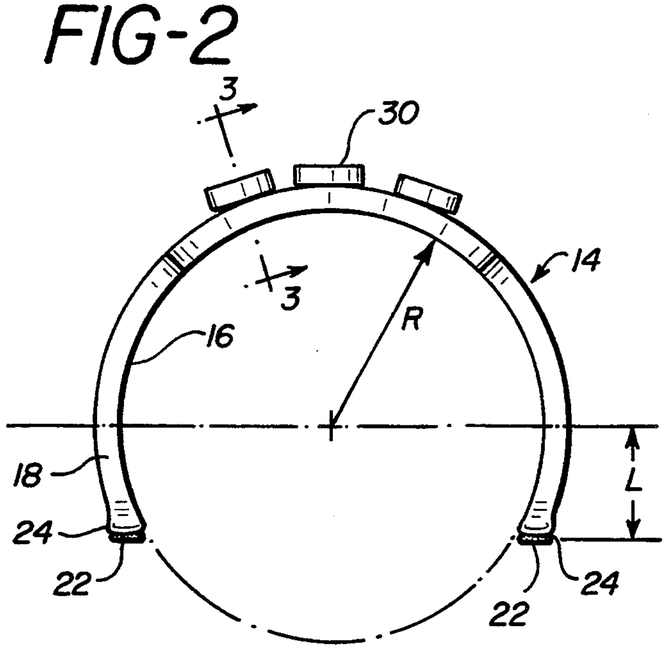
FIG. 2 is a top end view of the device of FIG. 1.

Referring now to the drawings, a device 10 in accordance with an embodiment of the invention is illustrated as being releasably affixed to an object, shown as a conventional soda can generally indicated at 12. The device 10 includes a flexible arcuate member 14 arranged and constructed to releasably clamp about the external surface of the can 12. To this end the arcuate member 14 includes a semi-circular portion 16 having a smooth interior surface and leg portions 18 and 20 extending from the ends of the semi-circular portion 16. The semi-circular portion 16 and the extending leg portions 18 and 20 define an opening for accommodating an object, such as a bottle or can, and are arranged such that when positioned on the outside of the object the device is tightly but releasably clamped to the outside of such object. In general, the inner circumference of the semi-circular portion 16 and of the leg portions 18 and 20 approximates but is slightly smaller than the outer circumference of the object to which it is to be releasably affixed. To provide a simple and convenient means for storing the device when it is not in use, the leg portions 18 and 20 terminate in enlarged, outwardly directed planar magnet face surfaces 22. Magnets 24 are disposed at the terminating ends of the leg portions 18 and 20 and define the enlarged outwardly directed magnet face surfaces 22.

The ratio of the radius, R, of the semi-circular portion 16 to the length, L, of an extending leg portion (18 or 20 ) is less than 5, and preferably is in the range of 1.5 to 2. Preferably, the arcuate member is moulded from a suitable flexible, resilient plastic material, such as Polyethylene or Polyvinyl Chloride for example, and is therefore relatively inexpensive and easy to manufacture. It will be understood, however, that any suitable material may be utilized for the flexible arcuate member 14 so long as the material will allow the arcuate member to flex sufficiently to be placed about the object and then contract to fit snugly and releasably clamp the device 10 to the object.

The semi-circular portion 16 of the flexible arcuate member 14 is provided with an enlarged central outer surface region 26 which is arranged and constructed to allow space for advertising copy, such as the name and logo of an organization, as well as providing space for affixing personal identifying indicia of the user of the device. Conveniently, the personal identifying indicia may be arranged to be releasably affixed to the enlarged region 26 of the semi-circular portion 16. To this end, the outer surface of the enlarged central region 26 of the semicircular portion 16 may be provided with a suitable groove. Track, or other suitable mounting means on which individual indicia, such as letters or numbers spelling out the name or other identifying criteria of the user may be releasably disposed. Alternatively, the enlarged central region 26 of the semi-circular portion 16 may be provided with a suitable area so that the personal identifying indicia may be affixed to such area of the enlarged central region 26 of the arcuate member 14 by a suitable marking device, or the identifying indicia may be affixed in any other convenient and suitable manner.

In the drawings the flexible arcuate member 14 is shown as being provided with a groove or track 28 to facilitate the attachment of desired personal identifying indicia, such as the name of the user of the device. As shown, identifying indicia units 30 are disposed in the groove 28 so as to provide for affixing the individual's personal identification, such as the individual's name, number, or other desired identifying criteria. In the arrangement illustrated each of the identifying indicia units 30 includes an alphabet letter on its face. The alphabet letters of the indicia units 30 are selected and arranged to spell the user's name or other personal identifying criteria and such units are then suitably disposed in the groove 28.

In a preferred embodiment of this invention the semi-circular portion 16 of flexible arcuate member 14 is provided with an enlarged central region 26. The outer surface of this enlarged central region 26 provides space for placing advertising copy as well as personal identifying indicia. For example, the space may be used as a promotional aid by affixing slogans or recognizable trademarks, or logos of a desired organization thereon, in much the same manner as the front panels of caps are used for advertising and promotion of the products or services of an organization. Although illustrated as a generally elliptical area, the enlarged central region 26 can be of any desired shape or configuration. For example, the region 26 may be made in the shape of a head, an animal, a cartoon character, or the like.

Figure 3:
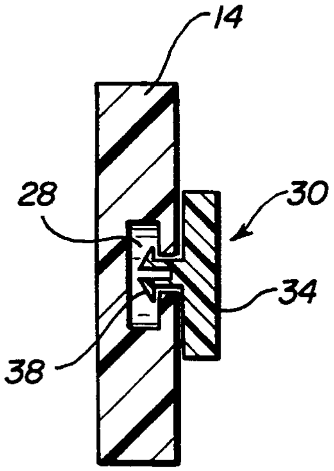
FIG. 3 is a cross-sectional view of the device of the invention taken along the line 3—3 of FIG. 2.

FIGS. 3 and 4 show in further detail suitable means for releasably mounting the identifying indicia units to the flexible arcuate member 14. For example, as illustrated in FIG. 3 each of the identifying indicia units 30 has a face 34 and a back 36. Extending from the back 36 of Indicia un it 30 are teeth 38 which are flexible and can be fitted into the groove 28 of the flexible arcuate member 14. Any other suitable means for mounting the Identifying Indicia units in of to the groove 28 can be employed.

FIG. 4 illustrates another suitable means for affixing identifying indicia units to the flexible arcuate member 14. As shown, the enlarged outer central region 26 is provided with an upwardly extending rail 40. An identifying indicia unit 42 is provided which is of generally C-shape and is arranged and adapted to fit oven an be held by the rail 40. As previously described, the identifying indicia unit 42 is provided with suitable indicia on the outer-face thereof, such as letters, numbers, of the like.

Alternatively, the groove 28 of rail 40 and associated identifying indicia units may be dispensed with and the identifying indicia (letters, numerals, on the like) affixed directly to the outer surface of the enlarged central region 26, such as by the use of a suitable marking pen, other suitable marking device capable of producing a moisture resistant indicia.

As shown in FIG. 1, the identifying indicia can be arranged to spell out the name of the individual user of the device (for example, "TOM"), of the user's initials, a selected number, or any other indicia selected by the user to personally identify the device as that of such user. In use, the owner or user of the device appropriately affixes the desired personal identifying indicia to the outer central surface region 26 of the flexible arcuate member 14. The flexible arcuate member 14 of the device is then releasably clamped on the outer surface of the container which is now personally identified. When not in use, the device may be conveniently stored for easy identification and retrieval by placing the planar magnet face surfaces of the leg portions 18 and 20 against any suitable member of ferromagnetic material, which may be a storage panel, a tray, the wall of an appliance, or the like. All that is required is that the panel be of ferromagnetic material so that the planar magnet face surfaces of the leg portions 18 and 20 will hold thereto. As illustrated in FIG. 5, the device 10 is shown conveniently stored by being placed on the door of a conventional refrigerator.

While there has been described what are at present considered to be the preferred embodiments of this invention, many changes and modifications not departing from the invention will occur to those skilled in the art. It is, therefore, intended in the appended claims to cover all such changes and modifications which come within the true spirit and scope of the invention.

What is claimed is:

1. A device for releasably affixing identifying indicia to an object, comprising:

a flexible arcuate member arranged and constructed to releasably clamp about the external circumferential surface of an object, said flexible arcuate member including a semi-circular portion having an inner circumference approximately the same as that of the outer circumference of the object to which it is to be releasably affixed, said semi-circular portion further having a leg portion extending from each end of said semi-circular portion, said semi-circular portion further including an enlarged central region having an outer surface arranged and constructed to receive personal identifying indicia; and means to facilitate storage of said device when it is not in use, said means including enlarged outwardly directed planar magnet face surfaces disposed at the terminating end of each of said leg portions to allow said device to be held to a ferromagnetic member for storage of said device when it is not in use.

2. The device recited in claim 1 wherein said flexible arcuate member is moulded from a flexible, resilient plastic material.

3. The device recited in claim 1 wherein the outer surface area of said enlarged central region of said flexible arcuate member is arranged and constructed to provide space for receiving advertising copy as well as space for receiving personal identifying indicia of the user of said device.

4. The device recited in claim 1 wherein the ratio of the radius R of the semicircular portion of said flexible arcuate member to the length L of the leg portion is less than 5.

5. A device for releasably affixing identifying indicia to an object, comprising:

a flexible arcuate member arranged and constructed to releasably clamp about the external circumferential surface of an object, said flexible arcuate member including a semi-circular portion and leg portions extending from each end of said semi-circular portion, each such leg portion terminating in enlarged outwardly directed planar magnet face surfaces, the ratio of the radius R of said semi-circular portion to the length L of a leg portion extending therefrom being less than 5, said semicircular portion further including an enlarged central region having an outer surface arranged and constructed to receive selected indicia; and means to facilitate storage of said device when it is not in use, said means including magnet means disposed at the terminating ends of each of said leg portions of said flexible arcuate member and arranged and constructed to provide the enlarged outwardly directed magnet face surface at the terminating ends of each of said leg portions to allow said device to be held to a ferromagnetic member for storage of said device when it is not in use.

6. The device recited in claim 5 wherein the ratio of the radius R of the semi-circular portion of said flexible arcuate member to the length L of a leg portion extending therefrom is in the range of 1.5 to 2.0.

7. The device recited in claim 5 wherein the outer surface area of said enlarged central region of said flexible arcuate member is arranged and constructed to provide space for receiving advertising copy as well as space for receiving personal Identifying indicia of the user of said device.

8. The device recited in claim 5 wherein said flexible arcuate member is made of Polyethylene.

* * * * *